United States Patent [19]
Stahler

[11] 3,893,167
[45] July 1, 1975

[54] MAGNETIC TAPE DUPLICATOR

[75] Inventor: Alfred F. Stahler, San Jose, Calif.

[73] Assignee: Ampex Corporation, Redwood City, Calif.

[22] Filed: Apr. 1, 1970

[21] Appl. No.: 24,761

[52] U.S. Cl. .................... 360/16; 360/71; 370/90
[51] Int. Cl. .................... G11b 5/86
[58] Field of Search...179/100.2 E, 100.2 P, 100.2 B, 179/100.2 T; 178/6.6 A

[56] References Cited

UNITED STATES PATENTS

| | | | |
|---|---|---|---|
| 2,747,026 | 5/1956 | Camras | 360/17 |
| 3,037,090 | 5/1962 | Bouzemburg | 179/100.2 E |
| 3,091,794 | 4/1963 | Pillsbury | 179/100.2 P |
| 3,161,120 | 12/1964 | Timares et al. | 179/100.2 P |
| 3,298,006 | 1/1967 | Milenkovic | 179/100.2 E |
| 3,472,971 | 10/1969 | Van Den Berg | 179/100.2 E |
| 3,519,760 | 7/1970 | Hatley | 179/100.2 E |
| 3,573,390 | 4/1971 | Frost | 179/100.2 E |
| 3,600,523 | 8/1971 | Schuller | 179/100.2 E |

*Primary Examiner*—Stuart N. Hecker

[57] ABSTRACT

High speed contact duplicating of a magnetic copy tape from a magnetic master tape is effected by a pair of pinch rollers for pressing the tapes together and into adhesion contact such that the air is squeezed from between the tapes and they adhere together until forcibly separated, and transfer excitation means immediately downstream from the pinch rollers to cause printing of the copy tape with minimum opportunity for shearing motion of the tapes relative to one another. The path of the tape downstream from the pinch rollers is also kept straight to minimize shearing motion, and tape cleaning means are provided upstream from the pinch rollers to augment the effectiveness of the adhesion contact. For television tapes, the audio and cue tracks may be separately read from the master and the control track from the copy and re-recorded on the copy downstream from the transfer excitation means. The tapes are separated during rewind mode. A multiple tape loop vacuum column storage bin is also provided for operation of the master tape in endless form, and the vacuum supply to the bin is servoed to control the feeding of tape from the bin to the pinch rollers. Means are also provided to make repeated copies of any selected portion of the master as by automatically stopping the copy tape at the end of the selected portion of the master, and rewinding the master to the beginning of the selected portion.

17 Claims, 4 Drawing Figures

PATENTED JUL 1 1975 3,893,167

SHEET 1

INVENTOR.
ALFRED F. STAHLER

BY Robert G. Clay

ATTORNEY

PATENTED JUL 1 1975 3,893,167

SHEET 2

INVENTOR.
ALFRED F. STAHLER

BY Robert D. Clay

ATTORNEY

MAGNETIC TAPE DUPLICATOR

BACKGROUND OF THE INVENTION

The present invention relates to the duplication of magnetic tapes, and particularly to the dynamic transfer type of duplicating apparatus.

Previously a standard method for duplicating magnetic tapes has been to read the signal from a master tape with a playback head and to record the read signal on a copy tape with a record head. While this method may be used to make more than one copy at a time, and at high speed, it is not feasible for the high speed duplication of television signal masters, because the rotational rates that would be required of the reading and recording head drums, and the extended bandwidth electronic requirements, are far beyond the present state of the art.

The bifilar method, in which a master and a copy tape are superimposed and wound in sandwiched fashion upon a common reel, which is then subjected to a time-decreasing transfer excitation field for several seconds, and then unwound, is satisfactory for television duplication in that it can be carried out at relatively high speed, but only one copy can be made at a time from each master.

The present invention falls into the field termed "dynamic transfer," in which the master and copy tapes are superimposed and passed through a transfer excitation field that progressively diminishes in strength over a spatial range as the tapes pass through. This procedure can also be carried out at high speed with television tapes, and more than one copy can be made at a time from one master.

Previously in the dynamic transfer art, commercial feasibility has been inhibited evidently because the limitations and conditions for successful practice of the technique have not been clearly understood. During the development of the present invention, for example, it was discovered that the oxide or magnetic surfaces of the master and copy tapes must be not merely superimposed, and not merely pressed into intimate contact, but must be very forcibly pressed, to the degree that all the air is squeezed out from between them, and they remain in what is termed "adhesion" contact, so that force must be used to separate them. The first condition for adhesion contact is the removal of the air from between the tapes whereupon the effect of atmospheric air pressure on both sides of the superimposed tapes, together with possible magnetic electrostatic, chemical or other attracting forces, retains the tapes together in the best possible relation for satisfactory printing of the copy to broadcast standard quality. The adhesion contact appears to have a further important effect, in that it inhibits relative longitudinal motion, or "shearing" motion, between the tapes while they are passing together through the transfer field. Such shearing motion tends to degrade the copy signal and can be induced through bending or flexing of the tapes around guides or other elements, or by mechanical vibrations of various types that may be induced in the tape by the transport mechanism. Accordingly in the present invention, the tape path from the point of first adhesion contact through the transfer field is kept perfectly straight, and the transfer field is located as close as possible to the point of first adhesion contact. Both sides of both tapes are also carefully cleaned just prior to their being pressed together.

Accordingly, it is an object of the present invention to provide means for securing adhesion contact of a master and a copy tape for the purpose of duplicating the copy.

It is another object to provide means for preventing shearing motion between the tapes during duplication.

It is a further object to provide a tape duplicating apparatus adapted for high speed multiple copying of broadband signal magnetic tapes, particularly television tapes, to commercial and broadcast standard quality.

SUMMARY OF THE INVENTION

High speed contact duplicating of a magnetic copy tape from a magnetic master tape is effected by a pair of pinch rollers for pressing the tapes together and into adhesion contact such that the air is squeezed from between the tapes and they adhere together until forcibly separated, and transfer excitation means immediately downstream from the pinch rollers to cause printing of the copy tape with minimum opportunity for shearing motion of the tapes relative to one another. The path of the tape downstream from the pinch rollers is also kept straight to minimize shearing motion, and tape cleaning means are provided upstream from the pinch rollers to augment the effectiveness of the adhesion contact. For television tapes, the audio and cue tracks may be separately read from the master and the control track from the copy and re-recorded on the copy downstream from the transfer excitation means. The tapes are separated during rewind mode. A multiple tape loop vacuum column storage bin is also provided for operation of the master tape in endless form, and the vacuum supply to the bin is servoed to control the feeding of tape from the bin to the pinch rollers. Means are also provided to make repeated copies of any selected portion of the master as by automatically stopping copy tape at the end of the selected portion of the master, and rewinding the master to the beginning of the selected portion.

DETAILED DESCRIPTION

Figure 1:
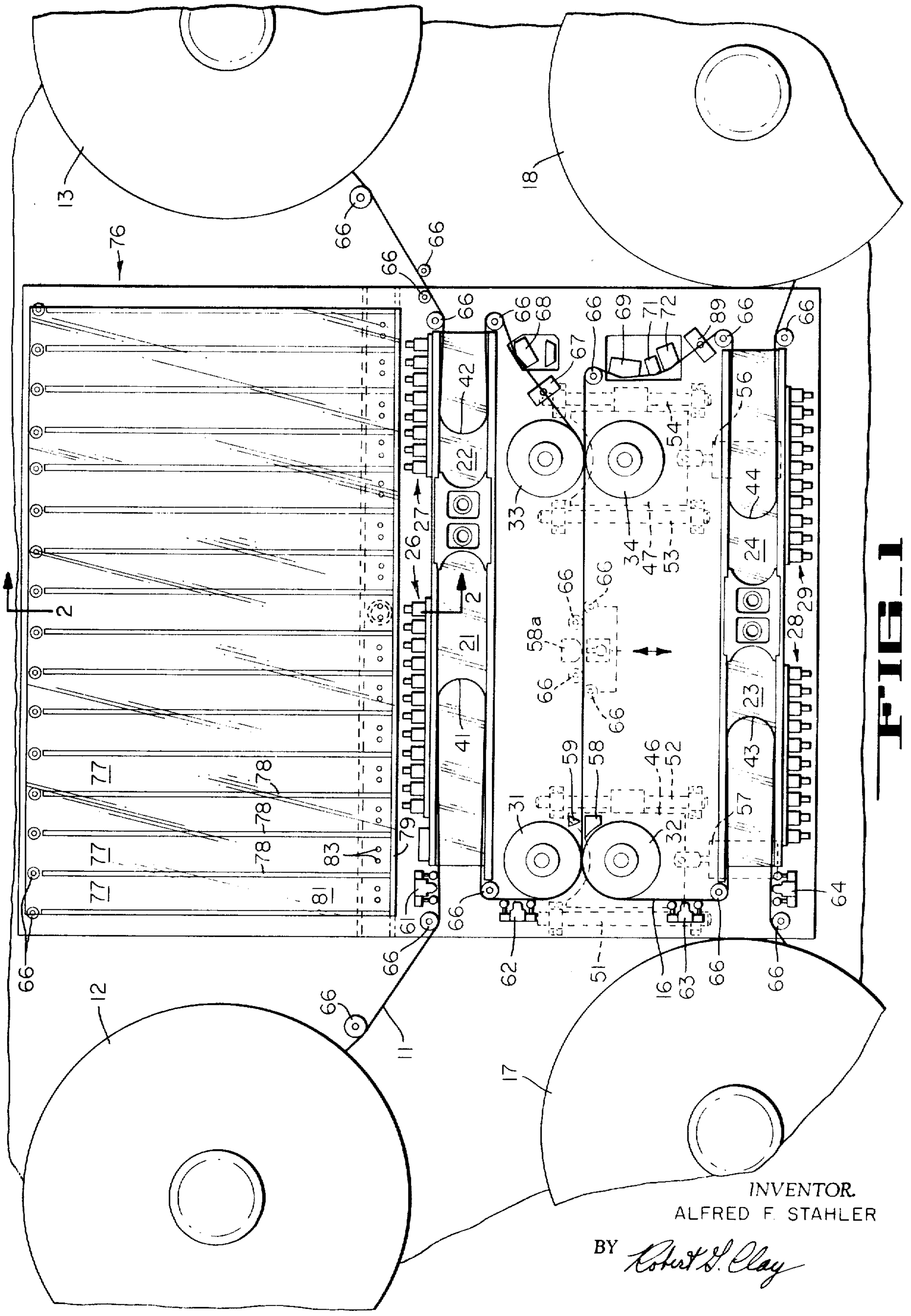
FIG. 1 is an elevation view, partly broken, of a duplicating apparatus in accordance with the invention.
Figures 2, 3, 4:
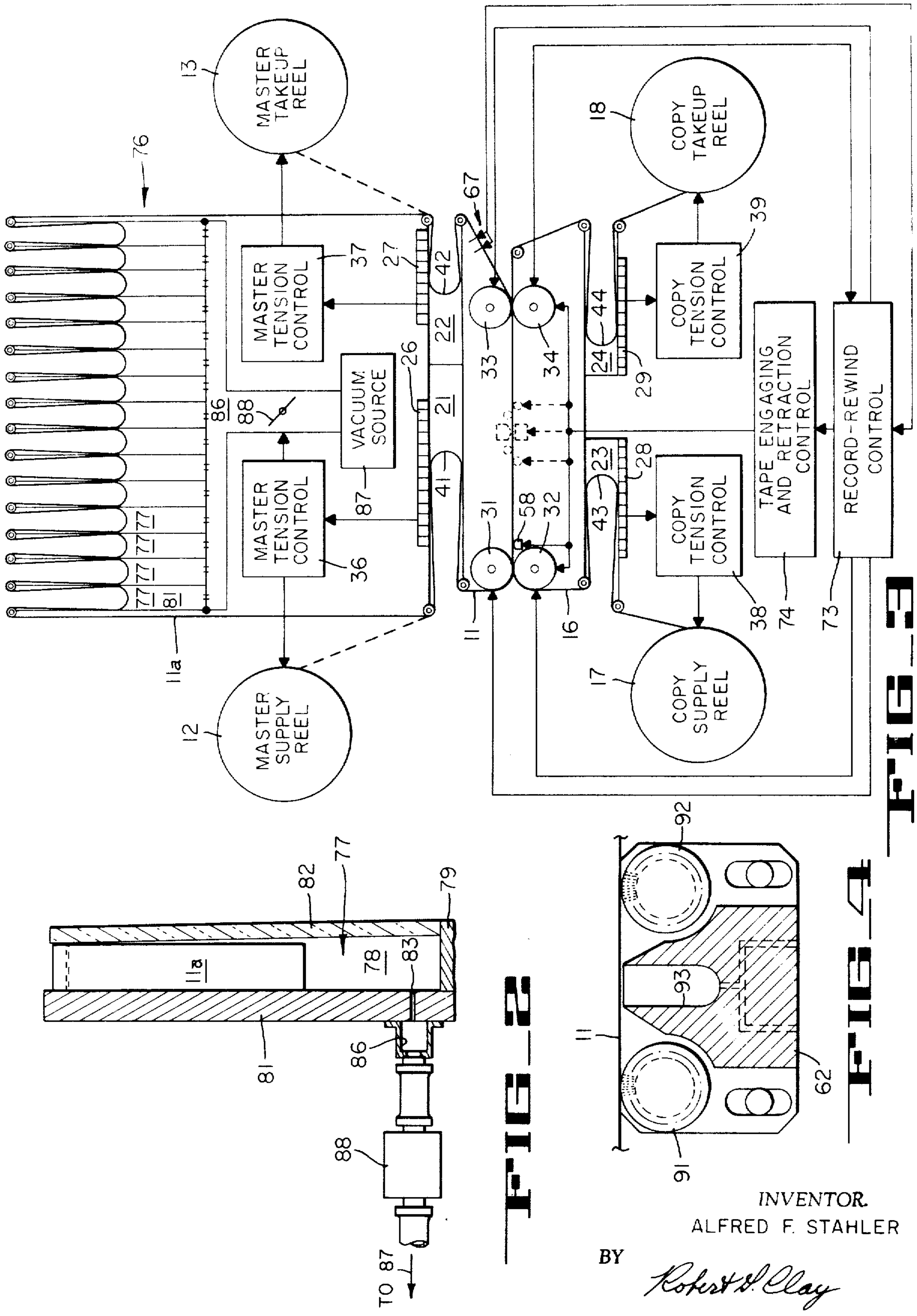
FIG. 2 is a cross-sectional view, to an enlarged scale, taken along the plane of lines 2—2 of FIG. 1.
FIG. 3 is a schematic diagram illustrating the operation of the invention.
FIG. 4 is a broken away view, to an enlarged scale, of a portion of the apparatus shown in FIG. 1.

As shown in FIGS. 1 and 3, the apparatus includes a master tape 11, a master supply reel 12, master takeup reel 13, a copy tape 16, copy supply reel 17, copy takeup reel 18, two pairs of first tape loop vacuum columns 21, 22, 23 and 24 with respective loop length sensing means 26, 27, 28 and 29 provided between the respective reels and a first pair 31, 32 and second pair 33, 34 of pinch rollers. Means 36, 37, 38 and 39 are provided to receive signals from the loop length sensing means and to control the associated reels to maintain the lengths of the tape loops 41, 42, 43 and 44 at a predetermined intermediate length and at a predetermined tension, as set by the value of the differential pressure established in the columns 21-24. The pinch rollers 32 and 34 are each mounted on a plate 46, 47 sliding on rails 51, 52, 53 and 54 for retraction of the rollers during threading and rewind modes to prevent undesired printing of the tape. The plates 46, 47 are retracted and urged into pinching position by means of air pressure cylinders 56, 57.

Also mounted on the plate 46, confronting the back of the copy tape, is a means 58 for applying transfer excitation to the superimposed tapes. Such excitation may take any of a number of known forms, e.g. alternating magnetic fields, radio-frequency excitation, high frequency sound excitation, or heat or other stress excitation. The preferred means 58 used with success in the present invention is a transducing head producing magnetic fields of rapidly reversing polarity, which appear to the tape to decrease in strength as the tape moves away from the means 58 toward the rollers 33, 34. An air jet means 59 may be provided opposite the means 58. Alternatively, a head **58*a* and jet means 59*a* may be provided in the middle of the run between the rollers 31, 32 and the rollers 33, 34. Improved results have been obtained, however, with the head 58 as close as possible to the point of tangency between rollers 31, 32, due probably to the fact that the tapes, which are pressed by the rollers 31, 32 into adhesion contact, have less opportunity to slip shearingly with respect to one another because of tension differences, vibrations or other causes, at the zone of head 58 closest to the rollers 31, 32.**

To minimize the probability of shearing slippage, the tape path from rollers 31, 32 through the transfer field of head 58 is kept perfectly straight, although a path of unchanging curvature may also be used if convenient. The rollers 31, 32 are made of large diameter and the incoming tapes are given a full 90° angle of wrap upstream from the point of tangency, so that the tension in the tape causes squeezing of the air entirely from between the tape and rollers, preparatory to the action of the rollers in squeezing all the air from between the tapes in producing the previously described adhesion contact. Also, tape cleaners 61, 62, 63 and 64 are provided for both sides of both tapes at convenient points upstream from the rollers 31, 32. Air lubricated guides 66 are provided at convenient points on the tape path. A marker sensing means 67 and a playback head stack 68 for reading audio and cue tracks from television tape are provided downstream from roller 33 on the master tape path, while downstream from the roller 34 on the copy tape path are located a playback head 69 for reading the control track, an erase head 71 for erasing the control, audio and cue tracks, and a record head stack 72 for re-recording the control, audio and cue tracks from the playback signals produced in the heads 68 and 69. Such re-recording is usually needed in producing television tape copies because the long wavelength audio, control and cue signals cannot be contact printed to broadcast quality under the conditions that are needed for contact printing the video portion of the signal.

A record-rewind control means 73 is provided for controlling the operation of the pinch rollers, each of which is provided with a motor (not shown) and may be selectively operated as either an idler, a driving capstan, or a holdback drag roller. During the recording mode, the means 73 operates a tape engaging and retraction control means 74 to cause rollers 31 and 32 to move upward into pinching position as shown, and operates roller 33 as a driving capstan and rollers 31, 32 as holdback tensioning rollers. Roller 34 operates as a pinch idler in this mode, and also as a tape speed tachometer, for it generates a signal representing its rotational speed.

During the rewind mode, the means 73 operates the means 74 to retract and withdraw rollers 32, 34 to prevent further printing, and operates rollers 31, 32 as driving capstans and rollers 33, 34 as idlers.

Also shown is a multiple tape loop storage bin 76 for use with a master tape **11*a* in endless form, as shown in FIG. 3. As shown in FIGS. 1 and 2, the individual loop columns 77 are defined by side walls 78, bottom walls 79, a back wall 81, and a transparent front wall 82. The front wall 82 is slightly sloped outwardly from top to bottom so as to define the individual loop columns 77 as tapering divergingly from top to bottom, so that as the tape loop grows longer, more atmospheric air is permitted to leak around the tape edges into the lower or vacuum portion of the column. Since the column is coupled to vacuum through restricted orifices 83,** this increasing leakage of air as the loop grows longer causes the vacuum pressure in the vacuum side of the loop to increase toward gauge pressure, with the result that the tensioning force in the column is decreased and the loop is restored to its desired and preselected medium length. An opposite result obtains when the loop grows too short.

For the purpose of servo controlling the feeding of tape from the bin 76 to the storage column 21, the bin 76 is provided with a common vacuum manifold 86 for all of the columns thereof, and the manifold is coupled to a vacuum source 87 through a regulating valve 88. The signal from the loop length sensing means 26 and control means 36 is then applied to control the valve 88 so that the orifice defined by the valve is decreased when the loop in column 21 is shorter than its desired intermediate length. This permits pressure to build up toward gauge pressure on the vacuum side of the columns 77 and assists in quickly feeding more tape to column 21 to more quickly lengthen the loop therein and restore the loop to the desired intermediate length. An opposite effect obtains when the loop in column 21 grows too long.

For repeated copying of selected portions of a master tape, which portions are too long for the bin 76, the sensing means 67 may be employed in combination with appropriate marker means (not shown) applied to the master tape. For example, metal tabs may be affixed to the master tape downstream from the beginning and ending of the selected portion, the downstream distance being equal to the distance between the head 58 and the sensing means 67 along the master tape path. The means 67 may be a light source the beam from which is reflected to a photo-electric cell to provide a tab sensing signal which is applied to the control means 73. Upon sensing the tab at the beginning of the selected portion, the control means 73 is arranged to place the apparatus in record mode. Upon sensing the tab at the end of the selected portion, the control means 73 places the apparatus in rewind mode, except that the copy tape 16 is stopped, and only the master tape is rewound until the beginning tab is again sensed, when the cycle is repeated. A similar tab sensing means 89 can be provided for the copy tape, as for end-of-tape sensing.

The tape cleaner is shown in greater detail in FIG. 4. A pair of spaced air lubricated guide posts 91, 92 are arranged to guide the tape under tension, and a hollow tubular element 93 is arranged with an open end confronting the tape between the guide posts and closely spaced from the tape to define a restricted passage between the tape and the open tubular end. Vacuum means (not shown) are provided to draw a vacuum in the tubular element 93 so as to cause air to pass at high scrubbing velocity between the tape and open tube end. The open tube end may be sharpened to a knife-like edge to cause maximum acceleration and scrubbing impact of the air entering the restricted passage between the tape and open tubular end.

What is claimed is:

1. Apparatus for magnetically duplicating a magnetic copy tape from a magnetic master tape, comprising:
means including a first pair of pinch rollers for bringing the magnetic sides of said master and said copy tape into superimposed adhesion contact;
means for urging said pinch rollers toward one another with sufficient pressure to squeeze out the air from between the magnetic sides of said tapes;
means for applying transfer excitation to said superimposed master and copy tape; and means for guiding said superimposed master and copy tapes in a path of unchanging curvature from said pinch rollers through and beyond said transfer excitation means so as to avoid relative longitudinal shifting of said magnetic sides of said tape during the imprinting thereof.

2. Apparatus as described in claim 1, wherein:
said path is straight and of unchanging zero curvature.

3. Apparatus as described in claim 2, wherein:
said transfer excitation means is positioned on said path downstream from said pinch rollers and imediately proximate to said pinch rollers.

4. Apparatus as described in claim 3, wherein:
each of said tapes is guided to have a substantial angle of wrap about one of said pinch rollers upstream from the point of tangency of said rollers; and
tensioning means are provided for said tapes upstream from said pinch rollers;
whereby the air film between said tapes and said rollers is squeezed out upstream from the point of tangency of said rollers and the point at which said tapes are brought into adhesion contact with one another.

5. Apparatus as described in claim 4, and adapted for duplicating television signals, in that:
means are provided, downstream from said transfer excitation means, for reading the control track from said copy tape and the cue and audio track, from said master and re-recording said audio, cue and control tracks on said copy tape.

6. Apparatus as described in claim 4, wherein the effectiveness of said adhesion contact is augmented as by the provision of:
tape cleaning means for both sides of both of said tapes upstream from said pinch rollers.

7. Apparatus as described in claim 6, wherein each of said tape cleaning means includes:
a pair of spaced guide elements around which said tape is guided under tension so as to be stretched tautly therebetween;
a hollow tubular element between said guide elements and oriented with an open end confronting said tape and closely spaced therefrom to define a restricted scrubbing passage for air between the tubular open end and the tape; and
means for drawing a vacuum pressure in said tubular element so as to cause air to pass at high velocity through said restricted passage between said open tube end and tape with a scrubbing cleaning effect.

8. Apparatus as described in claim 7, wherein:
said open end of said hollow tubular element is sharpened to define a knife-like edge, so as to cause maximum acceleration and scrubbing impact of said air entering said restricted passage between said open tubular end and said tape.

9. Apparatus as described in claim 4, wherein:
a second pair of pinch rollers are positioned downstream from said first pair of pinch rollers;
record-rewind control means are provided for selectively operating any of said pinch rollers as a driving capstan in either direction; and
tape engaging and retraction control means are provided for withdrawing said pinch rollers associated with one of said tapes a substantial distance from the rollers associated with the other tape for ensuring a transfer inhibiting spacing between said tapes during rewind thereof.

10. Apparatus as recited in claim 9, wherein:
said record-rewind control means is arranged to operate one of said second pinch rollers as a driving capstan during the recording mode;
tachometer means are provided on the other second pinch roller for delivering a signal representing the speed of the tape at the capstan; and
said record-rewind control means is arranged to operate said first pinch rollers as a drag tensioning means for said tape during said record mode.

11. Apparatus as described in claim 10, wherein:
said record-rewind control means is arranged to operate said tape engaging and retraction control means to withdraw said withdrawing rollers during the rewind mode; and
said record-rewind control means is further arranged to operate said first pinch rollers as driving capstans and said second pinch rollers as idlers during said rewind mode.

12. Apparatus as described in claim 11, wherein:
said transfer excitation means is mounted to confront the copy tape at a predetermined spacing therefrom both during the record and the rewind modes.

13. Apparatus as described in claim 12, wherein:
an air jet means is mounted to confront said master tape, opposite said transfer excitation means, and to be spaced from said master tape for a predetermined spacing in both said record and rewind modes.

14. Apparatus as described in claim 13, wherein:
said copy tape and said master tape are each wound on a pair of supply and takeup reels, and two pairs of first tape loop vacuum columns with loop length sensing means are provided between said respective reels and pinch rollers, said loop length sensing means being arranged to control the operation of the respective reels so as to maintain the lengths of said loops at a predetermined intermediate value in said columns.

15. Apparatus as described in claim 14, wherein said apparatus is adapted for the repeated copying of a selected portion of said master tape, as by the provision of:

beginning and ending marker means applied to said master tape at a predetermined distance downstream from the beginning and ending of said selected portion thereof; and means positioned on the master tape path at said predetermined distance downstream from said transfer excitation means for sensing the arrival of said beginning and ending markers on said master tape;

said sensing means being coupled to said record-rewind control means to cause said apparatus to operate in the recording mode when the beginning marker is sensed, and to operate in the rewind mode, but with the copy tape stopped, when said ending marker is sensed.

16. Apparatus as described in claim 14, wherein:

a multiple second vacuum column tape loop storage bin is provided for operation of the master tape in endless loop form;

said bin being provided with a common manifold for said multiple vacuum columns thereof;

a vacuum source and regulating valve are coupled to draw vacuum in said multiple columns through said common manifold thereof; and means are coupled between at least one of said first master tape loop vacuum columns and said regulating valve to control the operation of said regulating valve so as to control the feeding and takeup of tape from said first master tape loop columns during operation with an endless master tape, and so as to maintain the loop lengths in said first master columns at said predetermined intermediate value.

17. Apparatus as described in claim 16, wherein:

said regulating valve control means is coupled to receive a loop length sensing signal from said loop length sensing means of said first master supply reel tape loop vacuum column and to operate said regulating valve to decrease the orifice defined by said valve when the first master supply reel tape loop is shorter than said predetermined intermediate value, whereby the vacuum pressure in said second multiple bin columns is permitted to increase toward gauge pressure as by the leakage of air around the edges of said multiple tape loops, and tape is fed from said second multiple storage columns to cause corrective lengthening of said first master supply reel tape loop;

said regulating valve being conversely operated to increase the orifice defined therey when said first master supply reel tape loop is longer than said predetermined intermediate value, whereby tape is drawn into said multiple bin columns to correctively shorten said first master supply reel tape loop.

* * * * *